US012388652B2

(12) United States Patent
Tang et al.

(10) Patent No.: US 12,388,652 B2
(45) Date of Patent: Aug. 12, 2025

(54) HEADER FOR CONVEYING TRUSTFUL CLIENT ADDRESS

(71) Applicant: International Business Machines Corporation, Armonk, NY (US)

(72) Inventors: Gang Tang, Nanjing (CN); Liang Rong, Suzhou (CN); Guo Xing He, Suzhou (CN); Ming Shuang Xian, Wuxi (CN)

(73) Assignee: International Business Machines Corporation, Armonk, NY (US)

(*) Notice: Subject to any disclaimer, the term of this patent is extended or adjusted under 35 U.S.C. 154(b) by 586 days.

(21) Appl. No.: 17/325,356

(22) Filed: May 20, 2021

(65) Prior Publication Data

US 2022/0376924 A1 Nov. 24, 2022

(51) Int. Cl.
*H04L 9/32* (2006.01)
*H04L 67/02* (2022.01)

(52) U.S. Cl.
CPC .......... *H04L 9/3247* (2013.01); *H04L 9/3263* (2013.01); *H04L 9/3297* (2013.01); *H04L 67/02* (2013.01)

(58) Field of Classification Search
CPC ..... H04L 9/3297; H04L 9/3263; H04L 67/02; H04L 67/025; H04L 67/12; H04L 63/1425; H04L 63/1483; H04L 63/0421; H04L 63/0407; H04L 63/0414; H04L 12/66
See application file for complete search history.

(56) References Cited

U.S. PATENT DOCUMENTS

| | | | |
|---|---|---|---|
| 7,606,915 B1* | 10/2009 | Calinov | G06F 21/36 709/229 |
| 8,799,641 B1* | 8/2014 | Seidenberg | H04L 63/0281 713/168 |
| 8,881,248 B2 | 11/2014 | Liu | |
| 9,088,611 B2 | 7/2015 | Jagadeeswaran et al. | |
| 9,396,330 B2 | 7/2016 | Muthiah | |
| 9,589,282 B2* | 3/2017 | Fan | G06Q 30/0273 |
| 9,853,875 B1* | 12/2017 | Oztaskent | H04L 41/12 |
| 10,742,768 B2 | 8/2020 | Seo et al. | |
| 2010/0235632 A1 | 9/2010 | Iyengar et al. | |
| 2012/0124384 A1* | 5/2012 | Livni | H04L 63/126 713/178 |

(Continued)

FOREIGN PATENT DOCUMENTS

CN 108400955 B 12/2020

OTHER PUBLICATIONS

Menezes et al. Handbook of Applied Cryptography CRC Press 1997 (Year: 1997).*

(Continued)

*Primary Examiner* — Tae K Kim
(74) *Attorney, Agent, or Firm* — Stosch Sabo

(57) ABSTRACT

Described are techniques including a computer-implemented method comprising appending a HyperText Transfer Protocol (HTTP) header to a HTTP request, wherein the HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a signature. The method further comprises transmitting the HTTP request with the HTTP header to a web server.

11 Claims, 6 Drawing Sheets

(56) References Cited

U.S. PATENT DOCUMENTS

| | | | |
|---|---|---|---|
| 2014/0258465 A1 | 9/2014 | Li | |
| 2015/0120914 A1* | 4/2015 | Wada | H04L 43/04 709/224 |
| 2015/0326398 A1* | 11/2015 | Modarresi | G06F 21/44 713/168 |
| 2016/0285861 A1* | 9/2016 | Chester | H04L 63/0823 |
| 2016/0315956 A1* | 10/2016 | Giladi | H04L 63/1416 |
| 2016/0323409 A1 | 11/2016 | Kolhi et al. | |
| 2018/0034913 A1* | 2/2018 | Matthieu | H04L 67/52 |
| 2020/0084239 A1* | 3/2020 | Sherif | H04L 63/1466 |
| 2020/0211409 A1* | 7/2020 | Latorre | G16H 10/60 |
| 2020/0258118 A1* | 8/2020 | Kovvali | H04L 43/026 |
| 2020/0374568 A1* | 11/2020 | Kalish | H04N 21/2407 |
| 2021/0306369 A1* | 9/2021 | Pastore | G06F 21/31 |

OTHER PUBLICATIONS

Petersson et al., "Forwarded HTTP Extension", Internet Engineering Task Force (IETF), Request for Comments: 7239, ISSN: 2070-1721, Jun. 2014, 16 pages, <https://tools.ietf.org/html/rfc7239>.

Leach et al., "A Universally Unique IDentifier (UUID) URN Namespace", Network Working Group, Request for Comments: 4122, Jul. 2005, 32 pages, <https://tools.ietf.org/html/rfc4122>.

Klyne et al., "Date and Time on the Internet: Timestamps", Network Working Group, Request for Comments: 3339, Jul. 2002, 18 pages, <https://tools.ietf.org/html/rfc3339>.

Mell et al., "The NIST Definition of Cloud Computing", Recommendations of the National Institute of Standards and Technology, Sep. 2011, 7 pages.

* cited by examiner

HEADER FOR CONVEYING TRUSTFUL CLIENT ADDRESS

BACKGROUND

The present disclosure relates to networking, and, more specifically, to reliably conveying a client Internet Protocol (IP) address to a web server.

Web servers often require a client IP address to perform a variety of tasks related to processing HyperText Transfer Protocol (HTTP) requests such as, for example, access control, policy enforcement, rate limiting, diagnostics, and the like. However, in many cases, web servers are connected to a client through one or more proxy servers (e.g., HTTP proxy servers). In these situations, a web server may be aware of an IP address of a proxy server but not an IP address of an originating client.

SUMMARY

Aspects of the present disclosure are directed toward a computer-implemented method comprising appending a HyperText Transfer Protocol (HTTP) header to a HTTP request. The HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a signature. The method further comprises transmitting the HTTP request with the HTTP header to a web server.

Additional aspects of the present disclosure are directed toward a computer-implemented method comprising receiving, at a web server and from a proxy server, a HyperText Transfer Protocol (HTTP) request including a HTTP header. The HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a signature. The method further comprises validating the HTTP header and implementing the HTTP request.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
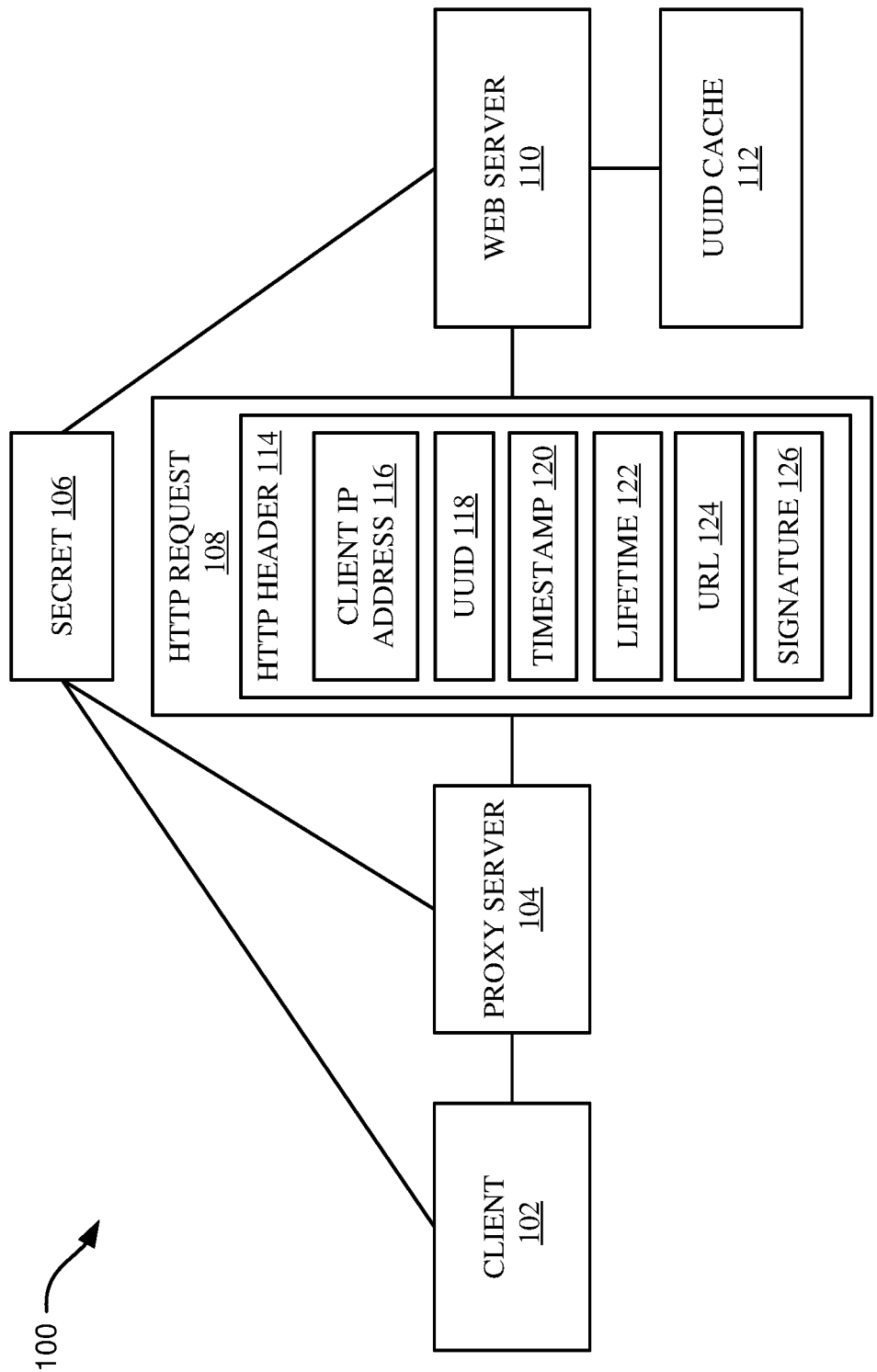
FIG. 1 illustrates a block diagram of an example computational environment for communicating a HTTP request including a custom HTTP header between a client and a web server, in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward networking, and, more specifically, to reliably conveying a client Internet Protocol (IP) address to a web server. While not limited to such applications, embodiments of the present disclosure may be better understood in light of the aforementioned context.

As discussed above, web servers sometimes require an IP address of an originating client to properly execute HTTP requests. However, in some instances, an IP address of an originating client is replaced by an IP address of one or more proxy servers coupling the originating client to the destination web server. To resolve this issue, the X-Forwarded-For HTTP header is commonly used. The X-Forwarded-For HTTP header enables an HTTP proxy to disclose the IP address of an originating client to the destination web server. As another method of resolving the issue, some vendors use proprietary HTTP headers to disclose the IP address of an originating client to a destination web server.

However, the aforementioned strategies for resolving the issue of conveying an IP address of an originating client to a destination web server are associated with drawbacks. For one, X-Forwarded-For HTTP headers and proprietary headers are not trustworthy insofar as the IP address of the originating client can be altered, modified, or otherwise tampered with by one or more intermediary proxy servers. As one example, a malicious actor may modify the IP address of the originating client in the X-Forwarded-For HTTP header and/or proprietary header in order to present false information to the destination web server. A second disadvantage is that network routings can require multiple proxy servers (e.g., a multi-hop path), such that a next-hop proxy server may overwrite, strip, or otherwise alter data in HTTP headers added by a previous-hop proxy server. As with the first disadvantage, this may ultimately cause the destination web server to be accidentally or maliciously presented with false information.

Aspects of the present disclosure overcome the aforementioned drawbacks to reliably convey an IP address of an originating client to a destination web server (regardless of how many intervening proxy servers may be involved) using a custom HTTP header. The custom HTTP header can include a client IP address, a URL, a timestamp, a lifetime, and/or a Universally Unique Identifier (UUID). Furthermore, the custom HTTP header can include a signature derived from one or more of the client IP address, the URL, the timestamp, the lifetime, and/or the UUID. The signature can be generated using an algorithm, certificate, or other secret shared between the web server and one or more of either the client or a proxy server. The custom HTTP header can be generated by either the originating client or a proxy server.

Upon receiving a HTTP request including the custom HTTP header, the destination web server can verify the HTTP request by using the shared secret, algorithm, or certificate to generate a second signature based on one or more of the client IP address, the URL, the timestamp, the lifetime, and/or the UUID contained in the custom HTTP header. If the signature generated by the web server matches the signature included in the custom HTTP header, then the web server can determine that the HTTP header, including the client IP address, has not been modified. Advantageously, aspects of the present disclosure not only provide an IP address of an originating client to a destination server, but further, aspects of the present disclosure do so in a manner that enables the destination web server to verify that the IP address of the originating client has not been altered in transit.

The destination web server can further verify additional aspects of the custom HTTP header before implementing the HTTP request. This may include checking details of a lifetime of the HTTP request, where a lifetime may be a predetermined period of time for which the HTTP request is defined as being valid. For example, the destination web server can ensure the lifetime has not expired (e.g., by comparing the lifetime to a current time, or by comparing a difference between a current time and the timestamp to the lifetime). As another example, the destination web server can verify the UUID has not been previously used. Together, these aspects of the present disclosure improve networking security by preventing repeat and/or replay attacks.

FIG. 1 illustrates a block diagram of an example computational environment 100 for communicating a HTTP request 108 including a HTTP header 114 between a client 102 and a web server 110, in accordance with some embodiments of the present disclosure. Client 102 can be any user device such as, but not limited to, a desktop, laptop, tablet, smartphone, endpoint device, or another user device. Client 102 can generate HTTP request 108. For example, client 102 can generate a HTTP request 108 as a result of using a web browser connected to the Internet, an intranet, or another network.

The HTTP request 108 generated by the client 102 can have a destination of a web server 110. However, the HTTP request 108 can be routed through one or more proxy servers 104 in order to reach the web server 110. Advantageously, either the client 102 or a proxy server 104 can append a HTTP header 114 to the HTTP request 108 to reliably convey the client IP address 116 to the web server 110.

The custom HTTP header 114 can include one or more of a client IP address 116, a UUID 118, a timestamp 120, a lifetime 122, a URL 124, and/or a signature 126. The client IP address 116 can be an IP address of the client 102 (e.g., the IP address of the device originating the HTTP request 108). The UUID 118 can be a unique identifier associated with the HTTP request 108. The UUID 118 can be compliant with RFC 4122. In some embodiments, UUID 118 is a UUIDv4 identifier (e.g., a UUID generated from a truly random or pseudo-random number), whereas in other embodiments, UUID 118 is a UUIDv5 identifier (e.g., a UUID generated from a namespace (e.g., the URL 124)).

The timestamp 120 can be a date and time that the HTTP request 108 was generated by the client 102. The lifetime 122 can define an expiration condition of the HTTP header 114. For example, the lifetime 122 can be a future date and time at which the HTTP header 114 expires, or, in other embodiments, the lifetime 122 can be an amount of time. When the lifetime 122 is a future date and time, the web server 110 can compare the lifetime 122 to a current date and time to determine whether or not the HTTP header 114 is expired. When the lifetime 122 is an amount of time, the web server 110 can subtract a current time from the timestamp 120 to determine whether the resulting amount of time is greater than the lifetime 122 (indicating the HTTP header 114 is expired) or less than the lifetime 122 (indicating that the HTTP header 114 is not expired).

The URL 124 can be a URL associated with the HTTP request 108. In some embodiments, the URL is associated with the web server 110. The URL 124 can be an absolute URL, a relative URL, or a different type of URL.

The signature 126 can be a signature generated using one or more of the client IP address 116, the UUID 118, the timestamp 120, the lifetime 122, and/or the URL 124. In some embodiments, the signature 126 is generated by using a secret 106 that is shared between the web server 110 and either the client 102 or the proxy server 104 (e.g., depending on whether the client 102 or the proxy server 104 creates the HTTP header 114). The secret 106 can be an algorithm, a hash function, a shared key, a digital certificate, or another secret 106 by which two or more parties can securely exchange information. For example, in some embodiments, the secret 106 is a pre-shared hash key.

Upon receiving the HTTP request 108 with the HTTP header 114, the web server 110 can validate the HTTP request 108 using the information in the HTTP header 114. For example, the web server 110 can generate its own signature using the secret 106 and the contents of the HTTP header 114. If the signature generated by the web server 110 matches the signature 126 in the HTTP header 114, then the web server 110 can confirm that the contents of the HTTP header 114 have not been accidentally or maliciously altered.

Furthermore, the web server 110 can verify that the UUID 118 has not been previously used by comparing the UUID 118 to UUIDs stored in a UUID cache 112. The UUID cache 112 can store previously used UUIDs. In some embodiments, the UUID cache 112 can purge UUIDs that have aged beyond a predetermined lifetime. Advantageously, comparing the UUID 118 to historical UUIDs in the UUID cache 112 enables web server 110 to prevent replay attacks (e.g., reused UUIDs). Likewise, purging the UUID cache 112 according to a predetermined lifetime of stored UUIDs reduces storage space, reduces computing power (e.g., for detecting matching UUIDs), and reduces the likelihood of UUID collisions (e.g., two or more identically generated UUIDs from distinct HTTP requests).

Furthermore, the web server 110 can verify whether the HTTP header 114 has expired by evaluating the lifetime 122, and, optionally, the timestamp 120. In other words, the web server 110 can compare the lifetime 122 to a current date and time to determine whether the HTTP header 114 is expired, whereas in other embodiments, the web server 110 can subtract a current time from the timestamp 120 and compare the result to the lifetime 122.

Finally, in some embodiments, the web server 110 can validate the URL 124. For example, the web server 110 can determine if the URL 124 is associated with the web server 110, is a working URL, and the like.

The components illustrated in the example computational environment 100 are shown for purposes of explanation and should be not construed as limiting. In other embodiments, more or fewer components than those components shown can exist. Furthermore, although not explicitly shown, the client 102, proxy server 104, secret 106, web server 110, and UUID cache 112 can be in intermittent, continuous, or semi-continuous communication (either directly or indirectly) with one another by one or more networks. Furthermore, although HTTP request 108 is presented as a stand-alone item, in reality, HTTP request 108 can exist in each of the client 102, one or more proxy servers 104, and/or the web server 110 at different points in time.

Figure 2:
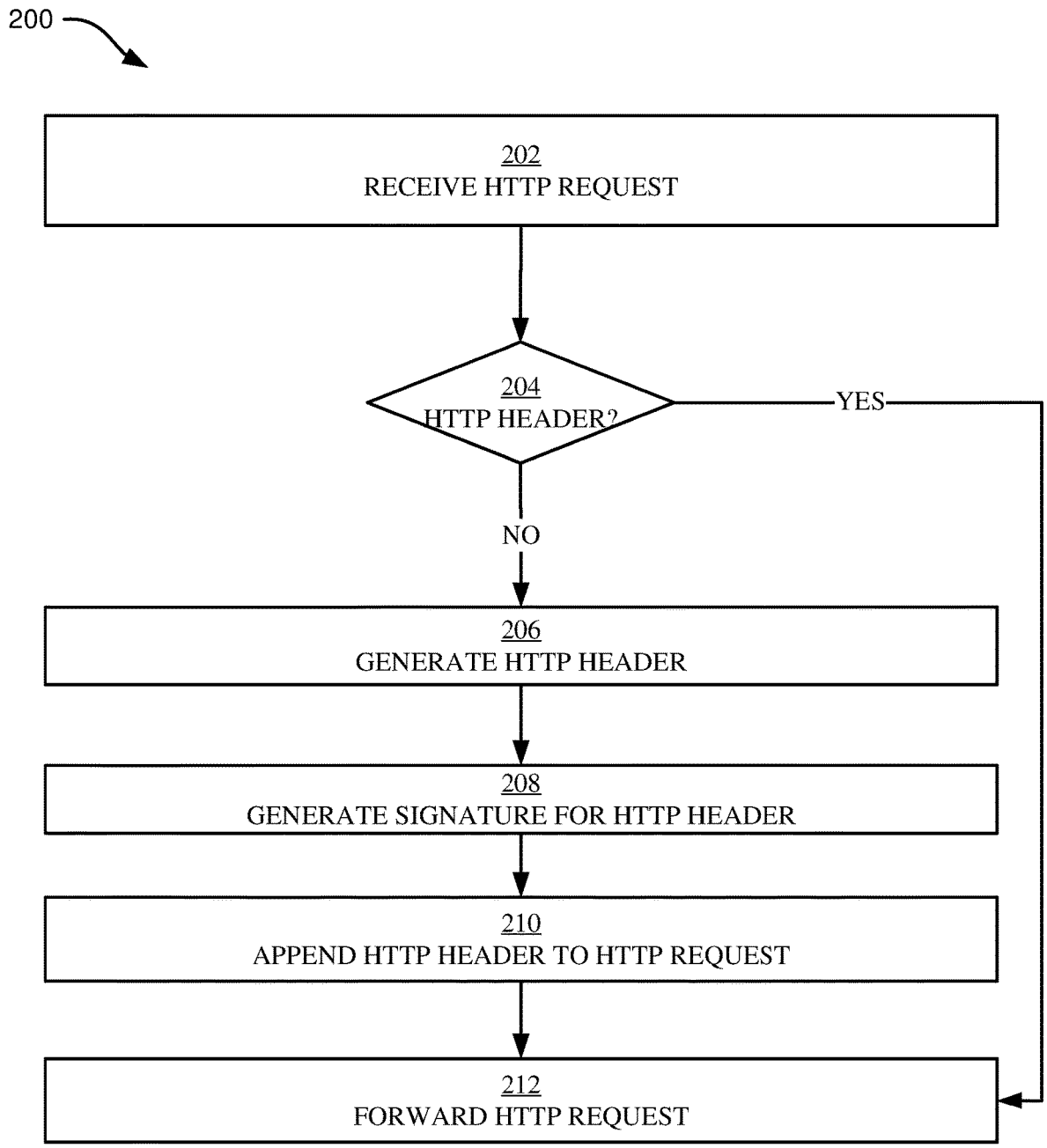
FIG. 2 illustrates a flowchart of an example method for generating a custom HTTP header, in accordance with some embodiments of the present disclosure.

FIG. 2 illustrates a flowchart of an example method 200 for generating a custom HTTP header 114, in accordance with some embodiments of the present disclosure. In some embodiments, the method 200 is implemented by a client 102, a proxy server 104, a computer, one or more processors, a device, or another configuration of hardware and/or software.

Operation 202 includes receiving an HTTP request 108. The HTTP request 108 can be received at a client 102 or a proxy server 104. When received at a client 102, the HTTP request 108 can be generated by the client 102. When received at a proxy server 104, the HTTP request 108 can be generated by a client 102 and transmitted to the proxy server 104 as part of a multi-hop path to a web server 110.

Operation 204 includes determining if a HTTP header 114 is included with the HTTP request 108. If so (204: YES), then the method 200 proceeds to operation 212 and forwards the HTTP request 108. Forwarding the HTP request 108 can involve transmitting the HTTP request 108 to the web server 110 or to a next proxy server 104 in a multi-hop path from the client 102 to the web server 110. If not (204: NO), then the method 200 proceeds to operation 206.

Operation 206 includes generating a HTTP header 114. Generating the HTTP header 114 can include associating a client IP address 116, a UUID 18, a timestamp 120, a lifetime 122, and/or a URL 124 with the HTTP request 108. Advantageously, in some embodiments, the HTTP header 114 can be generated by either the client 102 or a proxy server 104.

Operation 208 includes generating a signature 126 for the HTTP header 114. The signature 126 can be based on one or more of the client IP address 116, the UUID 18, the timestamp 120, the lifetime 122, and/or the URL 124. The signature 126 can be generated by encoding one or more of the aforementioned values using a secret 106, where the secret 106 is shared with the web server 110.

Operation 210 includes appending the HTTP header 114 to the HTTP request 108. Operation 212 includes forwarding the HTTP request 108. Forwarding the HTTP request 108 can involve transmitting the HTTP request 108 to the web server 110 or to a next proxy server 104 in a multi-hop path to the web server 110.

Figure 3:
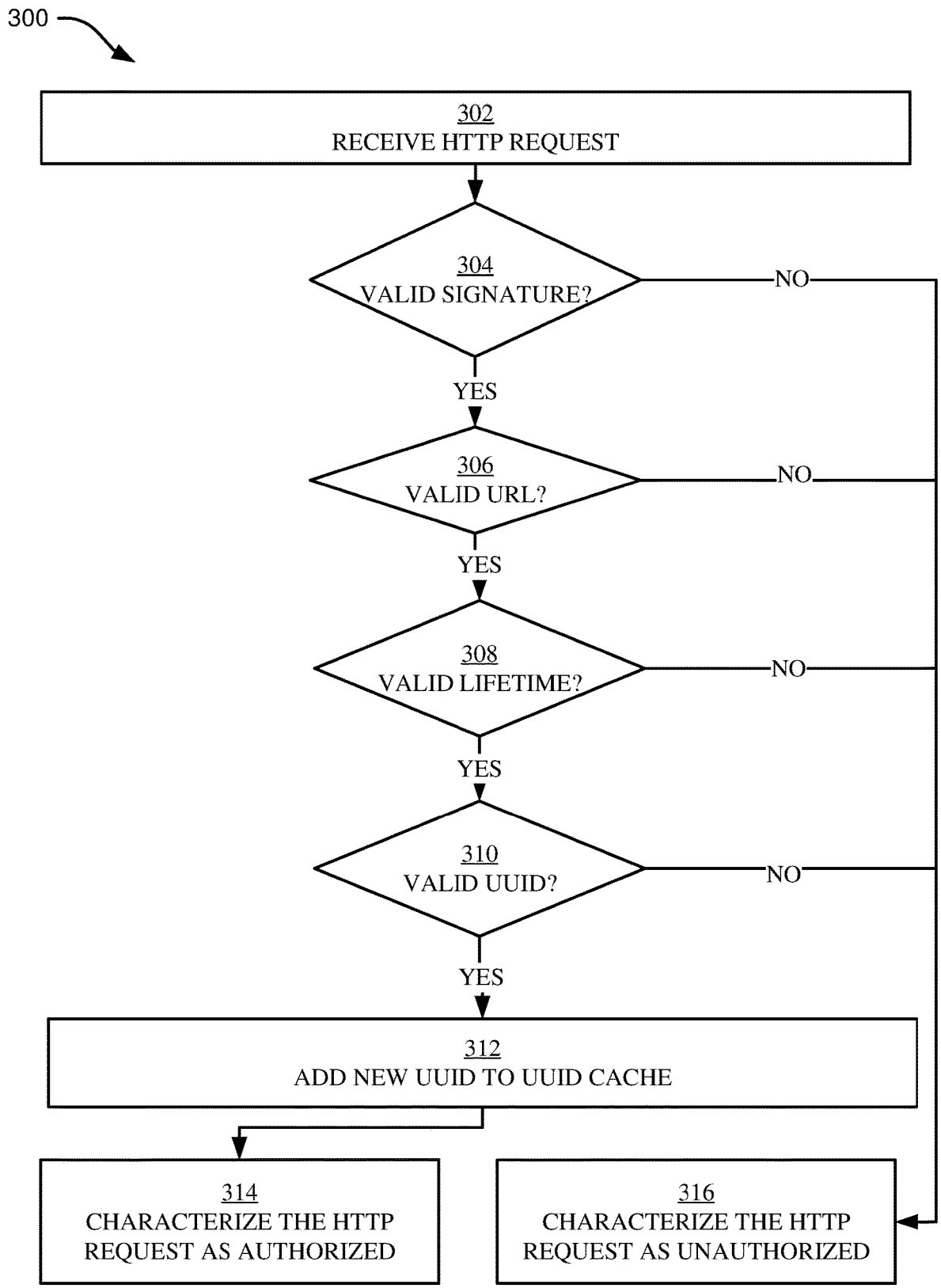
FIG. 3 illustrates a flowchart of an example method for validating a custom HTTP header, in accordance with some embodiments of the present disclosure.

FIG. 3 illustrates a flowchart of an example method 300 for validating a custom HTTP header 114, in accordance with some embodiments of the present disclosure. In some embodiments, the method 300 is implemented by a web server 110, a computer, one or more processors, a device, or another configuration of hardware and/or software.

Operation 302 includes receiving a HTTP request 108 at the web server 110, where the HTTP request 108 includes a HTTP header 114. Operation 304 includes determining if the signature 126 associated with the HTTP header 114 is valid. Operation 304 can include generating, by the web server 110, a signature using the secret 106 and contents of the HTTP header 114. If the signature generated by the web server 110 does not match the signature 126 included in the HTTP header 114 (304: NO), then the method 300 proceeds to operation 316 and characterizes the HTTP request 108 as unauthorized. If the signature generated by the web server 110 does match the signature 126 included in the HTTP header 114 (304: YES), then the method 300 proceeds to operation 306.

Operation 306 includes determining if the URL 124 included in the HTTP header 114 is valid. Operation 306 can include matching the URL 124 to a URL associated with the web server 110. If no match is found, the URL 124 is not valid (306: NO), and the method 300 proceeds to operation 316 and characterizes the HTTP request 108 as unauthorized. If a match is found, the URL 124 is valid (306: YES), and the method 300 proceeds to operation 308.

Operation 308 includes determining if the lifetime 122 included in the HTTP header 114 is valid. In some embodiments, operation 308 includes comparing the lifetime 122 to a current time. If the lifetime 122 is prior to the current time, then the HTTP header 114 is expired. In contrast, if the lifetime 122 is after the current time, then the HTTP header 114 is valid. As another example, operation 308 can include subtracting the timestamp 120 from a current time. If the resultant is greater than the lifetime 122, then the HTTP header 114 is expired. If the resultant is less than the lifetime 122, then the HTTP header is valid. If the lifetime 122 is expired, and thereby invalid (308: NO), then the method 300 proceeds to operation 316 and characterizes the HTTP request 108 as unauthorized. If the lifetime 122 is not expired, and thereby valid (308: YES), then the method 300 proceeds to operation 310.

Operation 310 includes determining if a UUID 118 included in the HTTP header 114 is valid. Operation 310 can include determining if there is a match between the UUID 118 and any UUID stored in a UUID cache 112. If there is a match, then the UUID 118 is not valid (310: NO), and the method 300 proceeds to operation 316 and characterizes the HTTP request 108 as unauthorized. If there is no match, then the UUID 118 is valid (310: YES), and the method 300 proceeds to operation 312.

Operation 312 includes adding the UUID 118 to the UUID cache 112. In some embodiments, UUIDs are purged from the UUID cache 112 upon expiration of a lifetime 122. Advantageously, purging the UUID cache 112 based on the lifetime 122 increases efficiency by controlling the size of the UUID cache 112. Furthermore, controlling the size of the UUID cache 112 improves performance be decreasing the risk of UUID collisions (e.g., two identical UUIDs separately generated for distinct HTTP requests 108).

The method 300 then proceeds to operation 314. Operation 314 includes characterizing the HTTP request 108 as authorized. Operation 314 can include implementing the HTTP request 108 by the web server 110. Likewise, operation 316 can include discarding an unauthorized HTTP request 108, generating a notification of the unauthorized HTTP request 108 (e.g., to a user interface, to a cybersecurity system, etc.), or otherwise mitigating the unauthorized HTTP request 108.

As will be appreciated by one skilled in the art, more or fewer operations than the operations shown in the method 300 can be implemented in different embodiments. For example, some embodiments can implement some, but not necessarily all, of the decision blocks 304-310.

Figure 4:
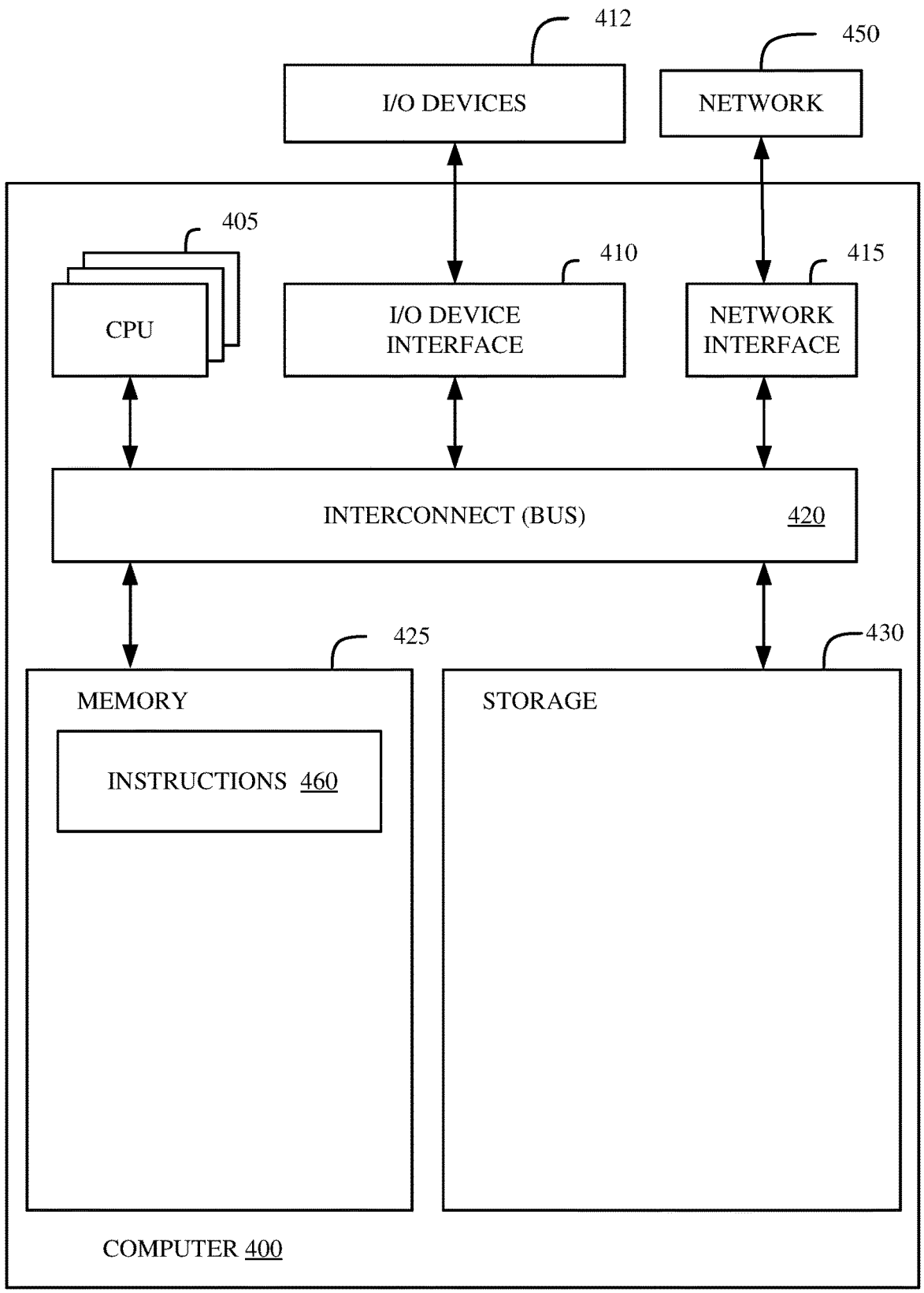
FIG. 4 illustrates a block diagram of an example computer, in accordance with some embodiments of the present disclosure.

FIG. 4 illustrates a block diagram of an example computer 400 in accordance with some embodiments of the present disclosure. In various embodiments, computer 400 can perform any or all portions of the method described in FIGS. 2-3 and/or implement the functionality discussed in FIG. 1. In some embodiments, computer 400 receives instructions related to the aforementioned methods and functionalities by downloading processor-executable instructions from a remote data processing system via network 450. In other embodiments, computer 400 provides instructions for the aforementioned methods and/or functionalities to a client machine such that the client machine executes the method, or a portion of the method, based on the instructions provided by computer 400. In some embodiments, the computer 400 is incorporated into (or functionality similar to computer 400 is virtually provisioned to) one or more entities illustrated in FIG. 1, and/or other aspects of the present disclosure.

Computer 400 includes memory 425, storage 430, interconnect 420 (e.g., a bus), one or more CPUs 405 (also referred to as processors herein), I/O device interface 410, I/O devices 412, and network interface 415.

Each CPU 405 retrieves and executes programming instructions stored in memory 425 or storage 430. Interconnect 420 is used to move data, such as programming instructions, between the CPUs 405, I/O device interface 410, storage 430, network interface 415, and memory 425. Interconnect 420 can be implemented using one or more buses. CPUs 405 can be a single CPU, multiple CPUs, or a single CPU having multiple processing cores in various embodiments. In some embodiments, CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random-access memory (e.g., static random-access memory (SRAM), dynamic random-access memory (DRAM), or Flash). Storage 430 is generally included to be representative of a non-volatile memory, such as a hard disk drive, solid state device (SSD), removable memory cards, optical storage, or flash memory devices. In an alternative embodiment, storage 430 can be replaced by storage area-network (SAN) devices, the cloud, or other devices connected to computer 400 via I/O device interface 410 or network 450 via network interface 415.

In some embodiments, memory 425 stores instructions 460. However, in various embodiments, instructions 460 are stored partially in memory 425 and partially in storage 430, or they are stored entirely in memory 425 or entirely in storage 430, or they are accessed over network 450 via network interface 415.

Instructions 460 can be computer-readable and computer-executable instructions for performing any portion of, or all of, the method of FIGS. 2-3 and/or implement the functionality discussed in FIG. 1. Although instructions 460 are shown in memory 425, instructions 460 can include program instructions collectively stored across numerous computer-readable storage media and executable by one or more CPUs 405.

In various embodiments, I/O devices 412 include an interface capable of presenting information and receiving input. For example, I/O devices 412 can present information to a user interacting with computer 400 and receive input from the user.

Computer 400 is connected to network 450 via network interface 415. Network 450 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
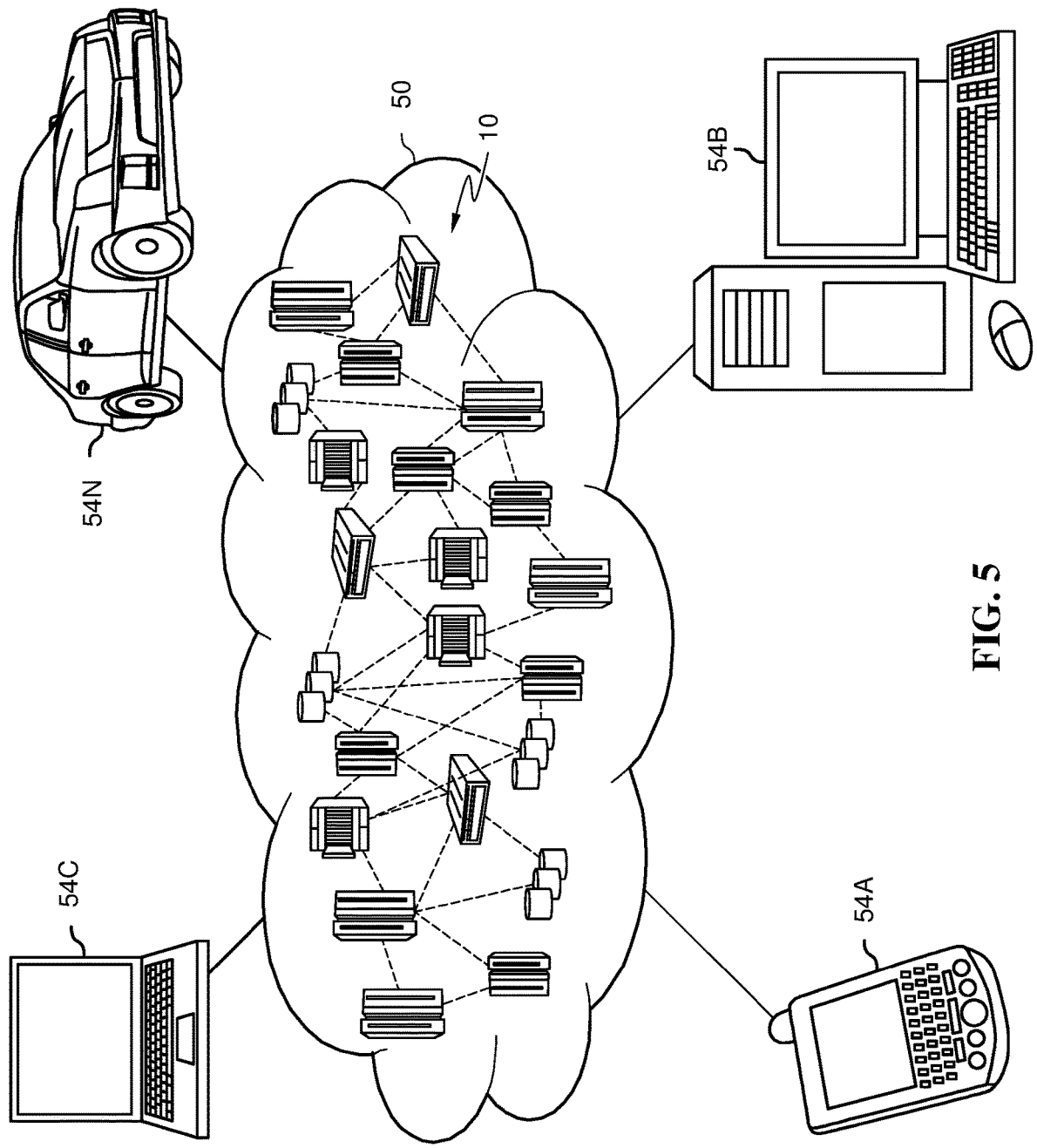
FIG. 5 depicts a cloud computing environment, in accordance with some embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
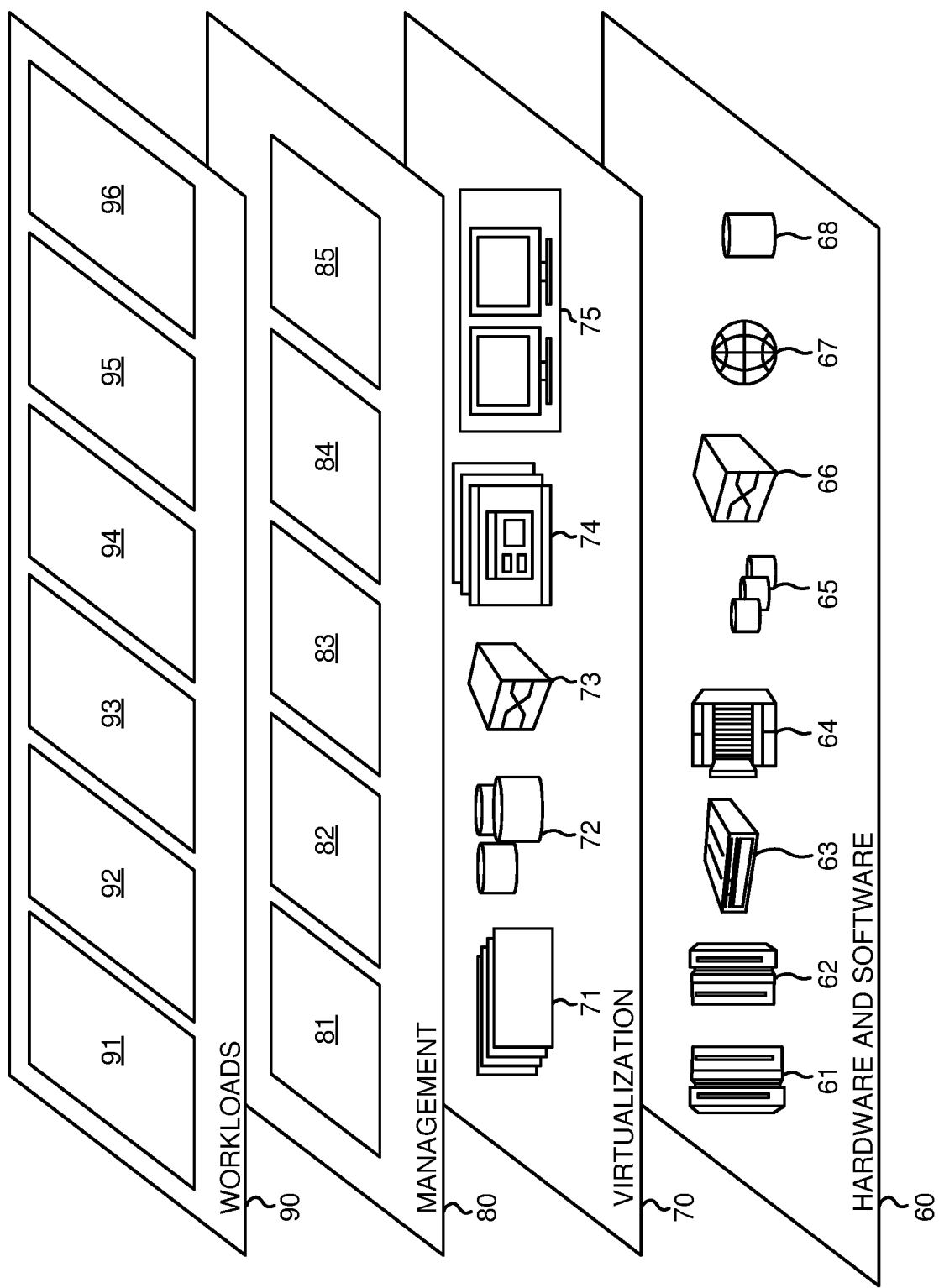
FIG. 6 depicts abstraction model layers, in accordance with some embodiments of the present disclosure.

Referring now to FIG. 6, a set of functional abstraction layers provided by cloud computing environment 50 (FIG. 5) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and custom HTTP header generation, transmission, and/or validation 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any portion of the method described with respect to FIGS. 2-3 and/or implement the functionality discussed in FIG. 1 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes appending a HyperText Transfer Protocol (HTTP) header to a HTTP request, wherein the HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a signature; and transmitting the HTTP request with the HTTP header to a web server.

Example 2 includes the method of example 1, including or excluding optional features. In this example, the HTTP header is appended to the HTTP request by the client.

Example 3 includes the method of any one of examples 1 to 2, including or excluding optional features. In this example, the HTTP header is appended to the HTTP request by a proxy server between the client and the web server.

Example 4 includes the method of any one of examples 1 to 3, including or excluding optional features. In this example, the timestamp comprises a time that the HTTP request is initiated.

Example 5 includes the method of any one of examples 1 to 4, including or excluding optional features. In this example, the signature comprises a hash of the source IP address, the UUID, the timestamp, the lifetime, and the URL using a hash key that is shared between the client and the web server.

Example 6 includes the method of any one of examples 1 to 5, including or excluding optional features. In this example, the signature comprises a hash of the source IP address, the UUID, the timestamp, the lifetime, and the URL using a digital certificate.

Example 7 includes the method of any one of examples 1 to 6, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 8 is a method. The method includes receiving, at a web server and from a proxy server, a HyperText Transfer Protocol (HTTP) request including a HTTP header, wherein the HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a signature; validating the HTTP header; and implementing the HTTP request.

Example 9 includes the method of example 8, including or excluding optional features. In this example, validating the HTTP header further comprises: validating the signature by comparing the signature in the HTTP header to a generated signature, wherein the generated signature is generated by hashing the source IP address, the UUID, the timestamp, the lifetime, and the URL using a secret shared between the web server and the client.

Example 10 includes the method of any one of examples 8 to 9, including or excluding optional features. In this example, validating the HTTP header further comprises: validating the lifetime by determining whether an expiration of the lifetime is after a current time.

Example 11 includes the method of any one of examples 8 to 10, including or excluding optional features. In this example, validating the HTTP header further comprises: validating the UUID by determining whether there is a matching UUID in a UUID cache. Optionally, the method includes adding the UUID to the UUID cache in response to determining that there is no UUID in the UUID cache that matches the UUID in the HTTP header.

Example 12 includes the method of any one of examples 8 to 11, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 13 is a system. The system includes one or more processors and one or more computer-readable storage media storing program instructions which, when executed by the one or more processors, are configured to cause the one or more processors to perform a method according to any one of examples 1 to 12.

Example 14 is a computer program product. The computer program product includes one or more computer readable storage media, and program instructions collectively stored on the one or more computer readable storage media, the program instructions comprising instructions configured to cause one or more processors to perform a method according to any one of examples 1 to 12.

What is claimed is:

1. A method comprising:
receiving, at a web server and from a proxy server, a HyperText Transfer Protocol (HTTP) request including a HTTP header, wherein the HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a hash based on the source IP address, the UUID, the timestamp, the lifetime, and the URL;
validating the UUID in response to determining that there is no UUID in a UUID cache that matches the UUID in the HTTP header;
implementing the HTTP request;
adding the UUID to the UUID cache;
invalidating, after adding the UUID to the UUID cache and before an expiration of the lifetime, a future HTTP request with a future HTTP header containing the UUID based on the UUID being stored in the UUID cache;
purging the UUID from the UUID cache upon the expiration of the lifetime; and
validating, after purging the UUID from the UUID cache after the expiration of the lifetime, a second future HTTP request with a second future HTTP header containing the UUID based on the UUID not being in the UUID cache.

2. The method of claim 1, wherein validating the HTTP header further comprises:
validating the hash by comparing the hash in the HTTP header to a generated hash, wherein the generated hash is generated by hashing the source IP address, the UUID, the timestamp, the lifetime, and the URL using a hash function that is shared between the web server and the client.

3. The method of claim 1, wherein validating the HTTP header further comprises:
validating the lifetime by determining whether the expiration of the lifetime is after a current time.

4. The method of claim 1, wherein the method is performed by one or more computers according to software that is downloaded to the one or more computers from a remote data processing system.

5. The method of claim 4, wherein the method further comprises:
metering a usage of the software; and
generating an invoice based on metering the usage.

6. A computer program product comprising one or more computer readable storage media, and program instructions collectively stored on the one or more computer readable storage media, the program instructions comprising instructions configured to cause one or more processors to perform a method comprising:
receiving, at a web server and from a proxy server, a HyperText Transfer Protocol (HTTP) request including a HTTP header, wherein the HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a hash based on the source IP address, the UUID, the timestamp, the lifetime, and the URL;
validating the UUID in response to determining that there is no UUID in a UUID cache that matches the UUID in the HTTP header;
implementing the HTTP request;
adding the UUID to the UUID cache;
invalidating, after adding the UUID to the UUID cache and before an expiration of the lifetime, a future HTTP request with a future HTTP header containing the UUID based on the UUID being stored in the UUID cache;
purging the UUID from the UUID cache upon the expiration of the lifetime; and
validating, after purging the UUID from the UUID cache after the expiration of the lifetime, a second future HTTP request with a second future HTTP header containing the UUID based on the UUID not being in the UUID cache.

7. The computer program product of claim 6, wherein validating the HTTP header further comprises:
validating the hash by comparing the hash in the HTTP header to a generated hash, wherein the generated hash is generated by hashing the source IP address, the UUID, the timestamp, the lifetime, and the URL using a hash function that is shared between the web server and the client.

8. The computer program product of claim 6, wherein validating the HTTP header further comprises:
validating the lifetime by determining whether the expiration of the lifetime is after a current time.

9. A system comprising:
one or more processors; and
one or more computer readable storage media storing program instructions which, when executed by the one or more processors, are configured to cause the one or more processors to perform a method comprising:
receiving, at a web server and from a proxy server, a HyperText Transfer Protocol (HTTP) request including a HTTP header, wherein the HTTP header includes a source Internet Protocol (IP) address of a client generating the HTTP request, a universally unique identifier (UUID) of the HTTP request, a timestamp, a lifetime, a Universal Resource Locator (URL) of the HTTP request, and a hash based on the source IP address, the UUID, the timestamp, the lifetime, and the URL;
validating the UUID in response to determining that there is no UUID in a UUID cache that matches the UUID in the HTTP header;
implementing the HTTP request;
adding the UUID to the UUID cache;
invalidating, after adding the UUID to the UUID cache and before an expiration of the lifetime, a future HTTP request with a future HTTP header containing the UUID based on the UUID being stored in the UUID cache;

purging the UUID from the UUID cache upon the expiration of the lifetime; and validating, after purging the UUID from the UUID cache after the expiration of the lifetime, a second future HTTP request with a second future HTTP header containing the UUID based on the UUID not being in the UUID cache.

10. The system of claim 9, wherein validating the HTTP header further comprises:

validating the hash by comparing the hash in the HTTP header to a generated hash, wherein the generated hash is generated by hashing the source IP address, the UUID, the timestamp, the lifetime, and the URL using a hash function that is shared between the web server and the client.

11. The system of claim 9, wherein validating the HTTP header further comprises:

validating the lifetime by determining whether the expiration of the lifetime is after a current time.

* * * * *